T. C. DEXTER & V. GARNER.
SLOWDOWN CLUTCH MECHANISM FOR SHEET CONVEYING MACHINES.
APPLICATION FILED OCT. 16, 1909.
1,045,685.
Patented Nov. 26, 1912.
5 SHEETS—SHEET 4.
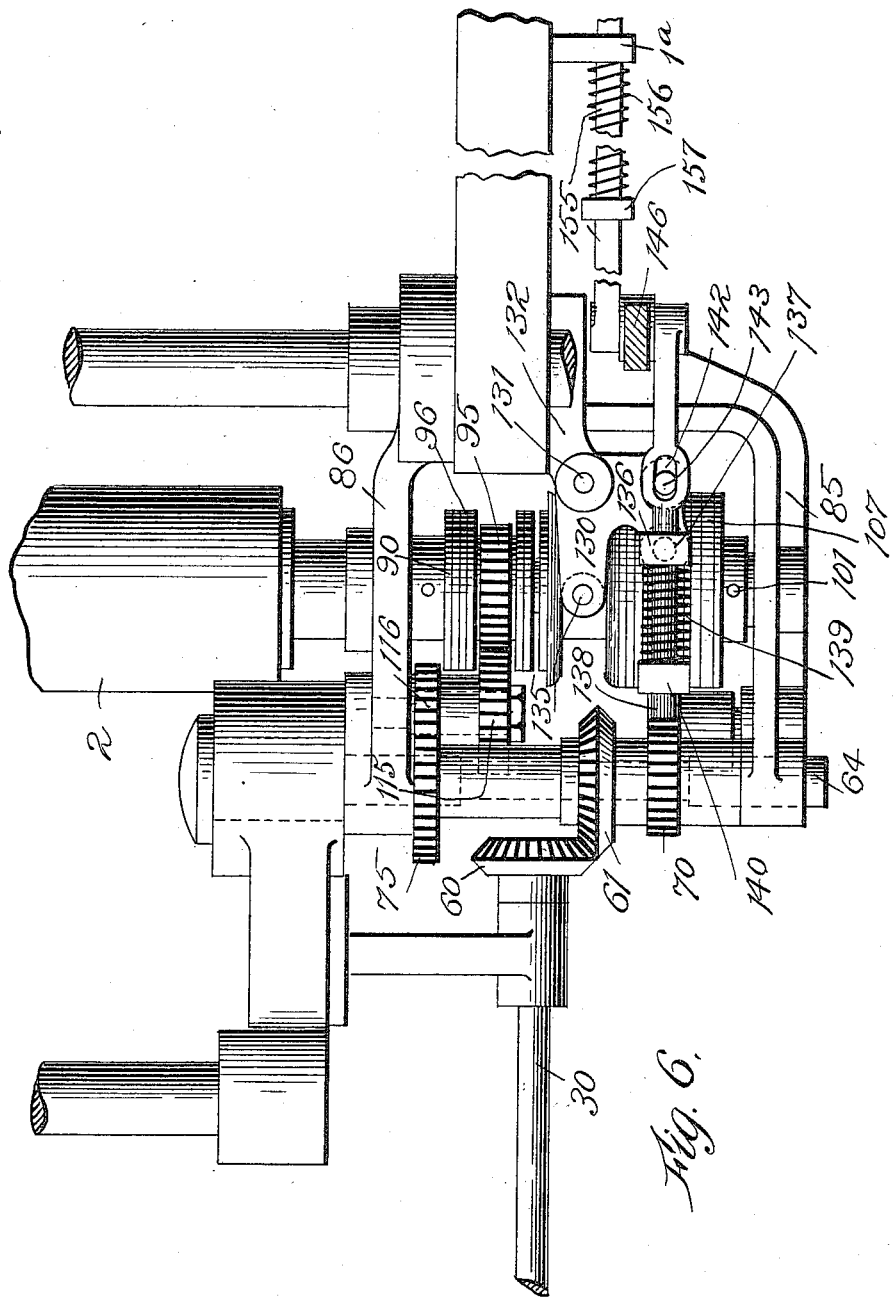

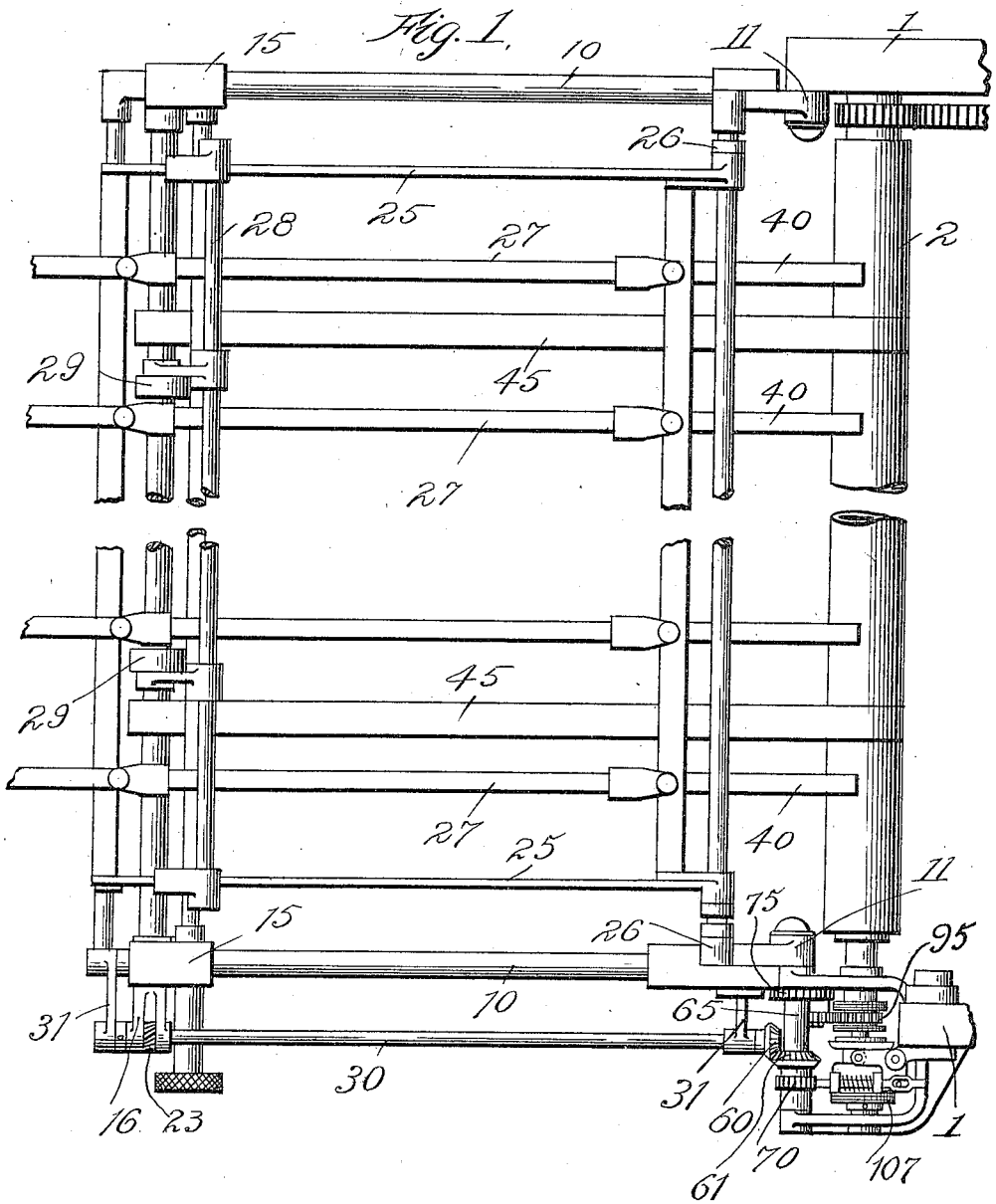

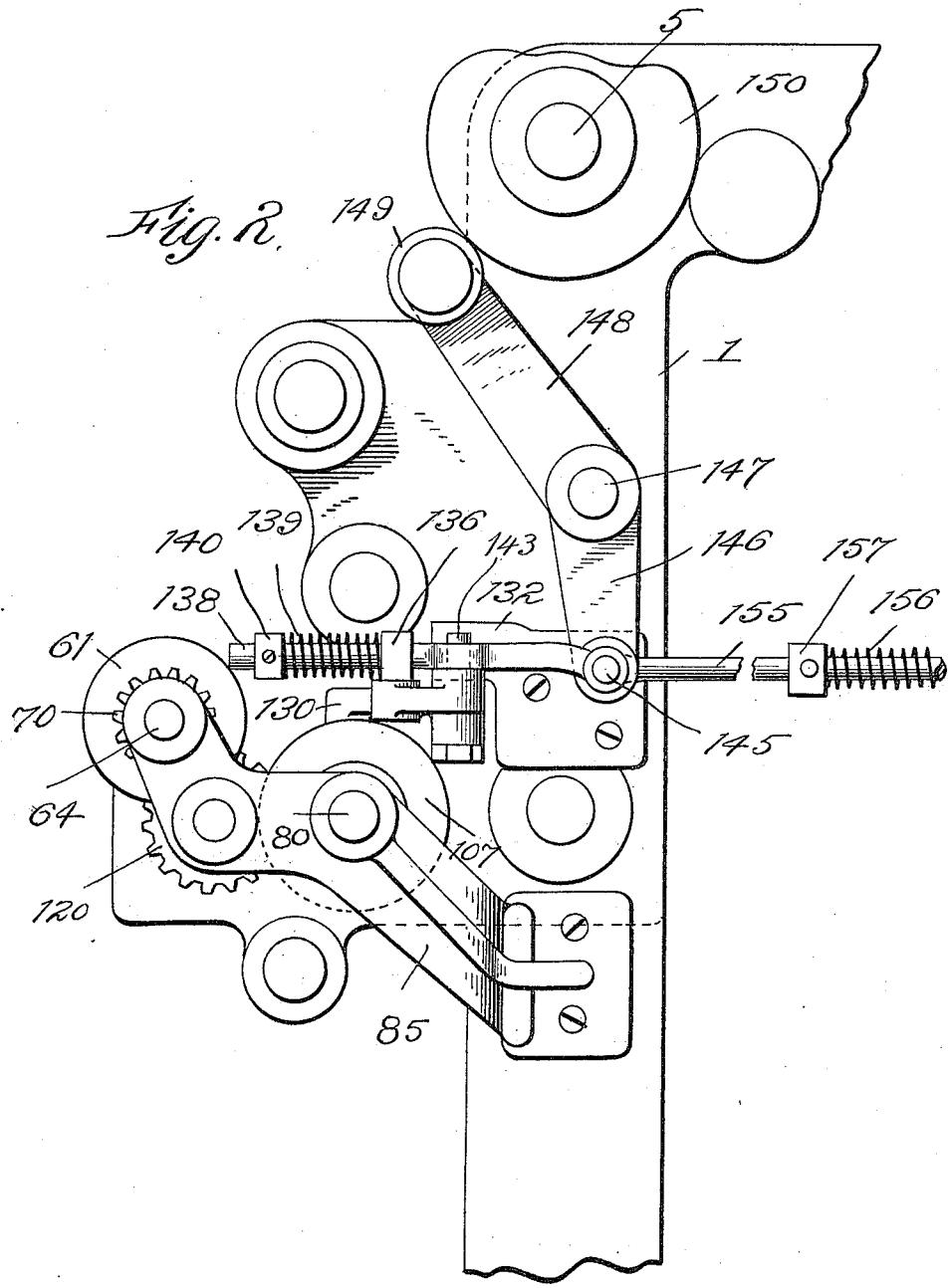

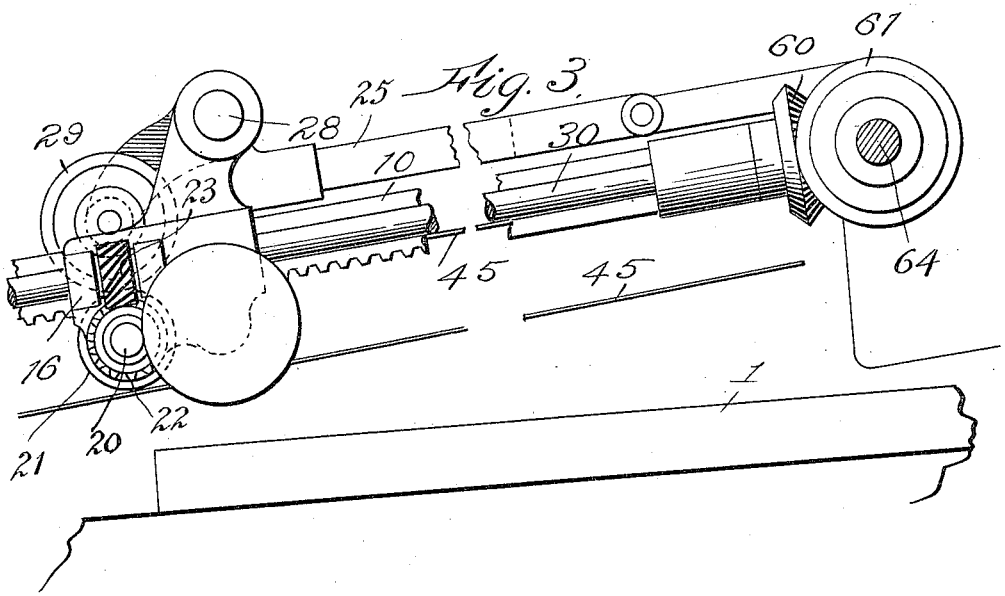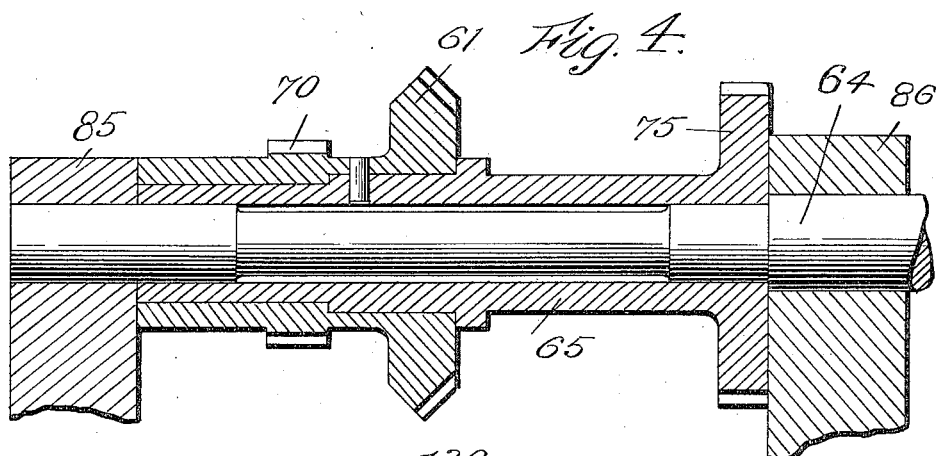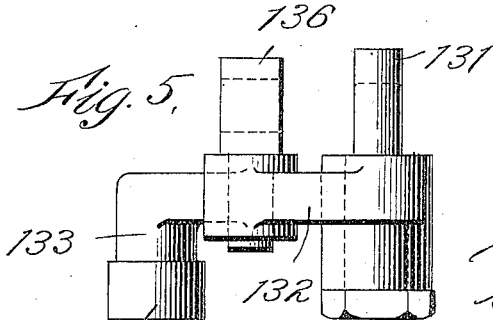

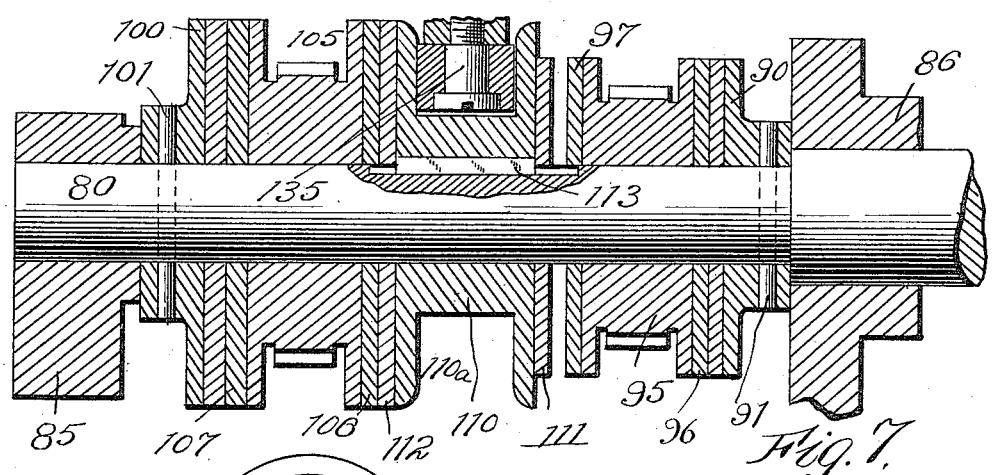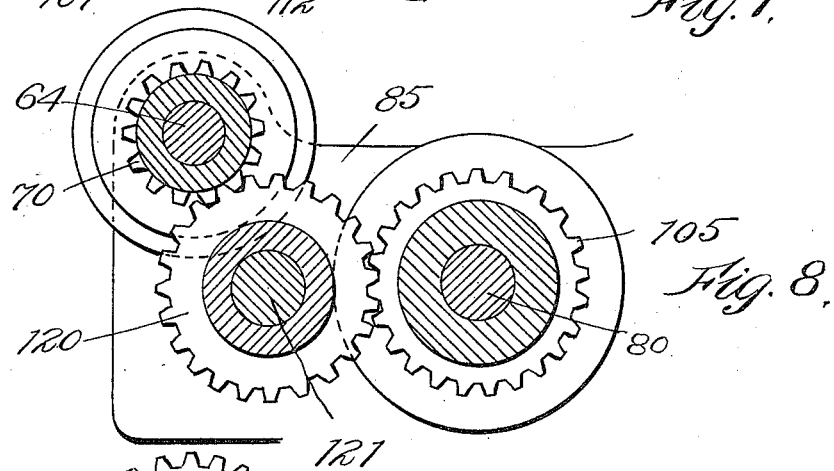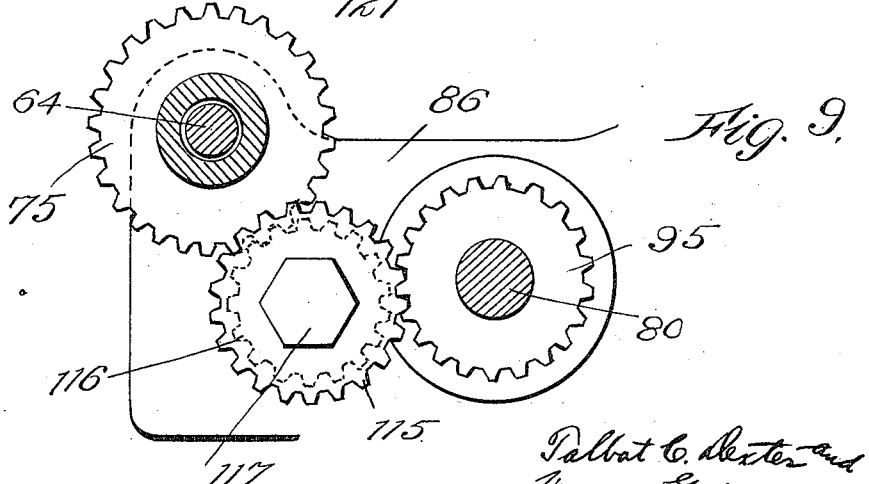

UNITED STATES PATENT OFFICE.

TALBOT C. DEXTER AND VERNON GARNER, OF PEARL RIVER, NEW YORK, ASSIGNORS, BY DIRECT AND MESNE ASSIGNMENTS, TO DEXTER FOLDER COMPANY, OF PEARL RIVER, NEW YORK, A CORPORATION OF NEW YORK.

SLOWDOWN CLUTCH MECHANISM FOR SHEET-CONVEYING MACHINES.

1,045,685.      Specification of Letters Patent.      Patented Nov. 26, 1912.

Application filed October 16, 1909. Serial No. 523,010.

*To all whom it may concern:*

Be it known that we, TALBOT C. DEXTER and VERNON GARNER, both citizens of the United States, and residents of Pearl River, county of Rockland, State of New York, have invented certain new and useful Improvements in Slowdown Clutch Mechanism for Sheet-Conveying Machines, of which the following is a specification.

The present invention relates to an improved frictional drive for slowdown mechanisms for sheet conveying machines, and the object of the present invention is to improve the construction and operation of such mechanisms with a view to rendering them more effective and reliable.

In order that our invention may be fully understood, we will first describe the same with reference to the accompanying drawings, and afterward point out the novelty more particularly in the annexed claims.

In said drawings: Figure 1 is a plan view of a sheet conveying machine having our improvements applied thereto. Fig. 2 is a detail side elevation of the frictional drive of the improved slowdown mechanism. Fig. 3 is a sectional side elevation of the conveyer frame showing particularly the arrangement of the slowdown rollers. Fig. 4 is a detail vertical sectional view showing the auxiliary tubular driving shaft and the arrangement of gears thereon. Fig. 5 is a detail view of the controlling bell crank lever for the frictional clutch. Fig. 6 is an enlarged plan view of the improved frictional driving mechanism. Fig. 7 is a vertical sectional view of the variable frictional clutch mechanism, and Figs. 8 and 9 are detail vertical sectional views illustrating the trains of gears arranged between the clutches and the auxiliary tubular driving shaft.

We have shown our improvements applied to the sheet conveying machine of the ordinary type usually employed for conveying successive sheets of paper from an automatic paper feeding machine to a printing press.

The forward part of the framework of the automatic feeder is indicated at 1, the delivery tape roller is indicated at 2, and the main cam shaft of the feeding machine is indicated at 5.

The main conveying frame 10 is pivotally connected with the feeder frame at 11 and supports the adjustable carriages or journal boxes 15 which may be moved longitudinally of the conveyer frame. Freely journaled in the adjustable carriages 15 is a transverse shaft 20 carrying the under feed rollers 21 which are arranged below the plane of feed of sheets. Keyed to the projecting end of the shaft 20 is a spiral gear 22 meshing with a similar spiral gear 23 which is adjustably splined upon a longitudinally extending driving shaft 30. This shaft 30 extends parallel with the conveyer frame 10 and is suitably journaled at its opposite ends in brackets 31 extending from the conveyer frame. A bifurcated arm 16 projects from one of the carriages 15 and embraces the spiral gear 23 to cause the same to move longitudinally upon its driving shaft to correspond with the adjustment of the carriages 15.

40 are rods or bars extending longitudinally of the conveyer frame to support the traveling sheets.

45 are endless conveyer tapes which pass around the delivery drum 2 and around tape rollers (not shown) which are loosely mounted upon the under feed shaft 20. These tapes 45 convey the successive sheets from the automatic feeding machine to the slowdown delivery mechanism.

An auxiliary frame indicated at 25 is pivotally mounted upon brackets 26 of the main conveyer frame, said auxiliary frame carrying the longitudinal rods or bars 27 to confine the traveling sheet against upward displacement, and a transverse shaft 28 supporting the friction rollers 29 which coöperate with the under feed rollers 21 to increase the frictional hold of said rollers upon the moving sheet. Such mechanism is illustrated and described in patent of Dexter No. 961,587 dated June 14th, 1910.

Mounted upon the rear end of the driving shaft 30 is a miter gear 60 which is in constant mesh with a similar gear 61 keyed to a tubular auxiliary driving shaft 65 freely journaled upon a pin or bolt 64. This pin or bolt 64 is the one which pivotally supports the conveyer frame 10 at 11.

Formed integral with the hub of the miter gear 61 is a gear wheel 70, and formed integral or otherwise rigidly secured to the tubular shaft 65 is another gear 75, it being observed, first that the gears 61, 70 and 75 are all rigidly connected with the shaft 65, and second that the gear 75 is of larger diameter than the gear 70. The tape drum 2, which is driven from the automatic paper feeding machine in any suitable manner, has its shaft or axis extended into a clutch shaft 80 journaled in the bracket arms 85 and 86 extending from the feeder frame proper and also having bearings to support the rod or bolt 64 above referred to.

90 is a friction disk encircling the clutch shaft 80 and secured thereto by a pin 91 passing through the hub of the disk and the shaft. 95 is a gear wheel formed with two oppositely presented friction disks or faces 96 and 97. This combined gear wheel and friction disk is loosely mounted upon the clutch shaft 80 alongside of the friction disk 90.

100 is a friction disk encircling the shaft 80 and rigidly secured thereto by the pin 101. 105 is a gear wheel formed with two oppositetly presented friction faces or disks 106 and 107. This combined gear wheel and friction disk is loosely mounted upon the shaft 80 adjacent to the friction disk 100.

110 is a spool formed with two oppositely presented friction faces or disks 111 and 112. This spool 110 is mounted between the friction disks 97 and 106 and is splined upon the shaft 80 as indicated at 113, so as to be free to move longitudinally upon the shaft but be compelled to rotate with the shaft. This friction spool 110 splined upon the shaft 80 is the means of conveying motion from shaft 80 to the differential driving gears 95 and 105 in the manner presently to be explained.

The frictionally driven gear 95 meshes with an intermediate gear 115 formed integral with a smaller gear 116 which meshes with and drives the gear 75 above referred to. The gears 115 and 116 are journaled upon a pin or bolt 117 mounted in the bracket arm 86. The frictionally driven gear 105 meshes with and drives an intermediate gear 120 which in turn meshes with and drives the gear 70 above referred to, the intermediate gear 120 being journaled upon a pin or bolt 121 mounted in the bracket arm 85.

130 is a bell crank lever pivotally mounted at its elbow 131 upon a bracket 132 secured to the machine frame 1. This bell crank lever 130 has a downwardly projecting boss 133 upon one arm on which is journaled an anti-friction roller 134 by means of a journal screw 135. This anti-friction roller 134 operates in the deep annular groove or channel 110ª of the friction spool 110, the roller being smaller in diameter than the width of said groove or channel so as to engage only one side of the groove in its operation of shifting the spool. The bell crank lever 130 also supports a block 136 which is freely pivoted upon the bell crank at 137. A rod 138 passes freely through an opening in the block 136 and supports a compression spring 139. This spring 139 encircles the rod 138 and is adjustably confined upon the rod against the pivoted block 136, by means of a collar 140 adjustably secured upon the rod 138. When the rod 138 is moved rearwardly, the movement tends to compress the spring 139 exerting pressure upon the block 136 to move the bell crank lever 130 for yieldingly forcing the friction spool 110 outwardly upon the shaft 80.

To the rear of the block 136, the rod 138 is formed with an elongated guide loop or slot 142 into which projects a pin 143 mounted upon the arm of the bell crank lever 130 adjacent to the block 136. This pin and slot connection between the rod and bell crank is for the purpose which will be hereinafter explained.

The rear end of the rod or link 138 is pivotally connected at 145 with the lower end of a rock arm 146 secured to a rock shaft 147 freely journaled in the machine frame and carrying an upwardly projecting rock arm 148 provided with an anti-friction roller 149 which runs in peripheral contact with a controlling cam 150 secured to the cam shaft 5 of the automatic feeding machine. This cam 150 has the main portion of its periphery concentric with shaft 5 to permit the slowdown rollers to operate at high speed during the major part of the operation of feeding a sheet. About one quarter of the working periphery of the cam is cut out to permit the slowing down of the rollers as each sheet approaches the front gages.

Pivotally connected at the lower end 145 of rock arm 146 is a tension rod 155 which extends rearwardly through a stationary guide 1ª and supports an expansion spring 156 which engages said stationary guide at one end and is confined with the desired tension by means of the adjustable collar 157 mounted upon the rod 155. The spring actuated rod 155 causes the rock arm 148 to follow the contour of the controlling cam 150 and when the arm drops into the lower part of the cam, applies a yielding pressure to the spool shifting bell crank 130 through the rod 138 and the pin and slot connection with said bell crank.

The operation of the improved slowdown mechanism for sheets will be clear from the following explanation. It will be understood that the feeding surfaces which control the advance of the successive sheets toward the ordinary gages of a printing press or other machine to which the sheets are fed consist of the under feed rollers 21 with which sheets are held in frictional engagement by the upper friction rollers 29. The slowdown feed rollers 21 are constantly driven through their shaft 20 and driving shaft 30 by the variable frictional driving gears above described. During the major part of the travel of a sheet from the automatic feeding machine to the gages of the press, these feed rollers 21 are operated at their highest speed so as to transfer the sheet as rapidly as possible. While these rollers are operating at their high speed, the shaft 30 is driven through the tubular shaft 65 and gear 61 by the gearing 70, 120 and 105, the gear 105 being during this period clutched to the driving clutch shaft 80 between the friction disk 100 fixed to the shaft 80 and the friction disk 112 carried by the clutch spool 110 which is splined upon the shaft 80. The clutch spool is held in this shifted position to effect the rapid drive of the feed roll by the engagement of rock arm 148 with the high main portion of controlling cam 150, which results in drawing rearwardly the rod 138 to compress the spring 139 against the block 136 carried by the bell crank lever 130, which forces the spool 110 outwardly to frictionally clamp the gear 105 between the friction disks 112 and 100. This frictional clamping of the gear 105 upon the clutch shaft is effected through the spring pressure referred to, so that in changing from the low speed to the high speed, there is no shock or jerk imparted to the mechanism, a result which is very important. As the leading edge of the traveling sheet nears the gages which are to arrest its movement in the position in which it is to be side registered, the low portion of the cam 105 reaches the anti-friction roller upon rock arm 148 and permits the spring 156 to move the rod 138 forwardly, relieving the tension of spring 139, and applying the tension of spring 156 to the bell crank lever 130 through the pin and slot connection between the bell crank and rod 138, with the result that the clutch spool 110 will be shifted inwardly to release the driving gear 105 and frictionally clamp the driving gear 95 between the friction disk 111 of the spool and the friction disk 90 secured to clutch shaft 80. When the driving gear 95 takes up the motion of shaft 80, it will drive the shaft 30 through the train of gears 115, 116 and 75 at a lower rate of speed than when said shaft was driven by the other train above referred to. This shifted position of the frictional driving mechanism is maintained for a very short period since it is only required to slow up the sheet just prior to its engagement at the front gages. In the application of this slow speed, it will be observed that the clutch spool is held in its shifted position through the yielding pressure of the spring 156, with the same important advantage of relieving the mechanism from shocks and jerks when the change from high speed to low speed is effected.

The employment of the flat-faced friction disks for clutching the variable driving gears to the clutch shaft is important in connection with the arrangement of springs for effecting the clutched position of these parts, for the reason that they afford a purely frictional connection between the engaged parts so that as the spring pressure is applied for clutching either the high speed or low speed driving gear, the change is gradual. The arrangement by which both driving gears are clutched between two coöperating frictional disks arranged upon opposite sides of corresponding disks carried by the gears, affords a very effective frictional drive and at the same time permits the use of the flat frictional faces and the spring devices for holding them into action so that the change from high to low speed and vice versa is more gradual than would be the case if a more positive form of clutch were employed. It will of course be understood that while sheet controlled rollers 21 are being driven through one set of gears, the other set will rotate idly.

What we claim is:

1. In a mechanism of the character described, the combination of high and low speed driving gears, a double acting friction clutch for throwing either of said gears into action, a clutch actuating lever, an operating rod having lost motion connection with said lever, a main spring actuated device connected with said rod, for moving it in one direction, an auxiliary spring confined upon said rod in engagement with said lever, and means for moving said rod against the action of said main spring actuated device to compress said auxiliary spring against said lever, substantially as set forth.

2. In a mechanism of the character described, the combination of high and low speed driving gears, and a double acting friction clutch for throwing either of said gears into action, with a clutch actuating lever, an operating rod having lost motion connection with said lever, an abutment upon said lever, a spring confined upon said operating rod in engagement with said lever abutment, a stationary abutment, a spring actuated rod connected with said operating rod and carrying a spring which is confined in engagement with said stationary abutment, and means for shifting said operating rod, whereby said clutch actuating lever will be moved by spring pressure in both directions.

3. In a mechanism of the character described, the combination of high and low speed gears, flat friction clutch faces upon said gears, a shaft upon which said gears are loosely mounted, a flat-faced friction clutch arranged between the clutch faces of said gears and splined upon said shaft, a lever for shifting said friction clutch in opposite directions to independently clutch said gears to the shaft, an operating rod having lost motion connection with said lever, an abutment upon said lever, a spring confined upon said operating rod in engagement with said lever abutment, a stationary abutment, a spring actuated rod connected with said operating rod and carrying a second spring which is confined in engagement with said stationary abutment, and means for shifting said operating rod, whereby both movements of the clutch will be effected through spring pressure and a gradual change of speed effected.

4. In a mechanism of the character described, the combination of a clutch shaft, two oppositely arranged frictional clutch disks fixed upon said shaft, high and low speed gears loosely mounted upon said shaft between said fixed clutch disks, friction disks mounted upon opposite faces of each of said high and low speed gears, a clutch spool splined upon said shaft between the friction disks of said gears, friction disks mounted upon opposite faces of said clutch spool, a bell crank lever engaging said spool, an operating rod having pin and slot connection with said bell crank lever, a block pivotally mounted upon said bell crank lever, through which said operating rod extends, a spring confined upon said operating rod in engagement with said pivoted block, a spring actuated rod connected with said operative rod and carrying a second spring, a stationary abutment confining said second spring, and a controlling cam arranged to actuate said operating rod, whereby said spool will be shifted in both directions by spring pressure to yieldingly clutch first one of said gears and then the other of said gears upon the shaft.

TALBOT C. DEXTER.
VERNON GARNER.

Witnesses:
A. C. HAMMOND,
ALLAN O. BECKER.

---

Copies of this patent may be obtained for five cents each, by addressing the "Commissioner of Patents, Washington, D. C."